Jan. 2, 1923.
J. H. DAVIES.
CLAW FOR MILKING MACHINES.
FILED JUNE 6, 1922.
1,440,912.
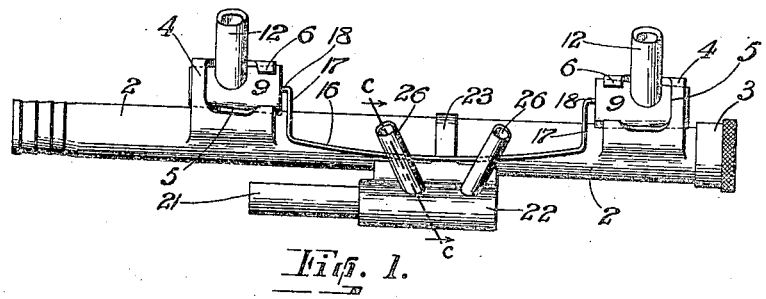
Fig. 1.
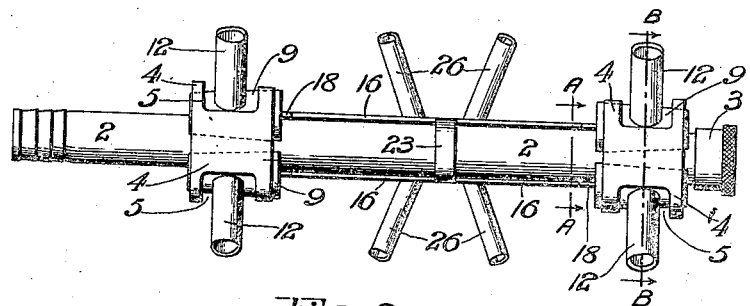
Fig. 2.
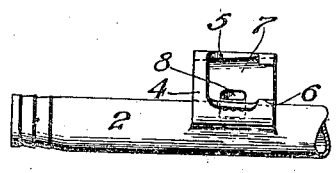      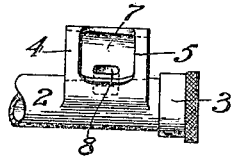      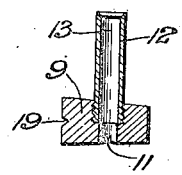
Fig. 3.      Fig. 4.      Fig. 5.
      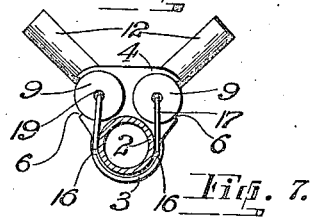
Fig. 6.      Fig. 7.
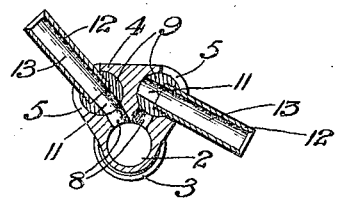      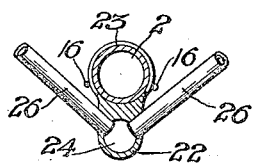
Fig. 8.      Fig. 9.
INVENTOR
J. H. Davies.
Attorney.

Patented Jan. 2, 1923.

1,440,912

UNITED STATES PATENT OFFICE.

JOHN HENRY DAVIES, OF MELBOURNE, VICTORIA, AUSTRALIA.

CLAW FOR MILKING MACHINES.

Application filed June 6, 1922. Serial No. 566,278.

*To all whom it may concern:*

Be it known that I, JOHN HENRY DAVIES, consulting engineer, a subject of the King of Great Britain and Ireland, and a resident of the city of Melbourne, in the county of Bourke, State of Victoria, Commonwealth of Australia, whose post-office address is 592 Bourke Street, in the said city of Melbourne, have invented a certain new and Improved Claw for Milking Machines, of which the following is a specification.

This invention relates to the devices used in pneumatic milking apparatus and known as claws to which the teat cups are connected by flexible tubes whereby the flexible lining of the cup is pulsated and the milk is delivered to the receiving vessel.

The invention is more particularly concerned in milking machine claws of the type having rotatable plugs carrying nipples to which the aforesaid flexible tubes are attached so that in the event of a cup accidentally falling from the cow or being temporarily hung downwardly from the claw the respective plug will be automaticaly turned to cut off communication between the cup and the milk pipe or both the milk and pulsation pipes of the apparatus. The vacuum in the pipe lines of the installation is thus maintained and the operation of the other teat cups and the machine as a whole is unaffected by the inaction of any particular cup or cups.

The primary object of the present invention is to provide an improved claw of the above general type embodying in a simple, compact and easily cleansed structure, four independent rotary plugs with attached nipples for connection to the milk tubes of individual teat cups, and a cluster of four fixed nipples for connection to the pulsation tubes of said teat cups. A further object of the invention is to provide an improved spring means to take up wear between the rotary plugs (which are longitudinally tapered) and the cylindrical plug casings, such spring means also acting, in one form of the invention, to retain the plugs in their casings. The features of the invention will however be more clearly defined in the appended claims.

Referring to the drawings which form part of this specification:—

Figure 1 is a side elevation of an improved claw constructed in accordance with the invention.

Figure 2 is a plan of Figure 1.

Figure 3 is a side view of portion of the milk pipe of the claw showing one of the plug casings with its plug removed.

Figure 4 shows a modification of the plug casing.

Figure 5 is a sectional view of one of the rotatable plugs with its attached milk nipple.

Figure 6 is a detail view of one of the springs which are adapted to press against the ends of the plugs for the purpose before mentioned.

Figure 7 is a cross section on line A—A of Figure 2.

Figure 8 is a cross section taken on line B—B of Figure 2 but showing the right hand plug turned to its cut off position so that the respective teat cup is disconnected from the milk pipe.

Figure 9 is a section taken approximately on line C—C of Figure 1.

A milking machine claw constructed in accordance with the invention comprises the usual milk pipe 2 adapted for connection at one end with the milk piping of the installation, and having at its other end a removable cap 3 for cleansing purposes. Disposed near each end of the milk pipe 2 and preferably formed integral therewith is a pair of cylindrical plug casings 4. These casings are open at both ends and the wall of each casing is provided with a circumferential opening 5 through which the milk nipple of the respective plug projects as hereinafter described.

If desired a portion of the wall of each casing 4 may be removed to form an open mouth or passage 6 extending from the opening 5 to one end of the casing as in Figures 1 and 3 so that the plugs hereinafter described may be readily introduced to and removed from their casings without detaching the milk nipples from the plugs. On the other hand the casings may be constructed, as in Figure 4, without such open mouth the nipple being in such case attached to the plug after the latter has been inserted in its casing.

The interior 7 of each plug casing 4 is longitudinally tapered to accommodate the corresponding tapered plug. Extending between the interior of each plug casing and the interior of the milk pipe 2 is a milk port or passage 8 which is preferably elongated in the direction of the length of the plug as in Figures 3 and 4 so that the co-operating ports hereinafter described, in the plugs are adapted to always register with the ports 8 of the casings notwithstanding any longitudinal movement of the plugs in the taking up of wear by the springs as hereinafter described.

Accommodated by each cylindrical casing 4 is a rotary tapered plug 9 having therein a transverse milk port 11 adapted, when the plugs are in normal or milking position, to register with the port 8 of the respective plug casing. Screwed or otherwise suitably attached to each plug is a milk nipple 12 having therethrough a milk passage 13. Each of these nipples is connected by the usual flexible tube to the milk nipple of a teat cup.

It will be evident from Figure 8 of the drawings that when such nipple is in its upward or milking position a substantially straight milk passage is formed from the outer end of the nipple to the interior of the milk pipe 2 so that a brush or the like may be passed right through said passage in cleansing same and there are no obstructions likely to impede the flow of milk or harbor impurities in the passage.

Each milk nipple 12 projects outwardly through the circumferential opening 5 of the respective plug casing so that the nipple is thus permitted to fall and turn the rotary plug into the position seen at the right of Figure 8. By this means the milk passage through the plug and nipple is automatically disconnected from the corresponding port 8 of the plug casing in the event of the respective teat cup falling from the animal or being disconnected from the teat and suspended from the claw for any purpose.

In combination with the foregoing I employ two springs each of which comprises a longitudinal intermediate portion 16 of slightly arched or bowed formation, an arm 17 extending sidewardly from each end of said intermediate portion, and a longitudinally disposed end portion 18 projecting substantially at right angles from each arm 17. Each of these end portions 18 is adapted to press into a recess 19 formed in the inner or larger end of one of the plugs 9 the springs being retained in compression between the two opposite plugs as in Figure 1 so that the plugs are thereby pressed longitudinally into their casings and any wear between the plug and plug casing is automatically taken up. At the same time, it will be evident that where the plug casings are provided with open mouths as in Figure 3 the springs removably retain the plugs in proper position within their casings.

Disposed beneath the milk pipe 2 is a short pulsation pipe 21 which is preferably secured to the milk pipe by a junction piece 22 having a circular portion or band 23 adapted to embrace the milk pipe to which it is secured by soldering or any other suitable means so that the milk and pulsation pipes form a unitary structure.

Secured to the junction piece 22 and communicating with the hollow interior 24 thereof and the interior of the pulsation pipe 21, is a cluster of four pulsation nipples 26. Each of these pulsation nipples is connected by the usual flexible tube with one of the teat cups for the purpose of pulsating the flexible lining thereof.

The invention provides a simple, compact and efficient claw wherein all the milk passages may be easily and thoroughly cleansed and wear on the plugs and plug casings is compensated for by the simple spring device. By the automatic cutting off of communication between the teat cups and the milk pipe 2, in which a continual suction or vacuum obtains, the working of the apparatus is unaffected by such circumstances as the falling of a cup from the cow's udder. With such an arrangement it is unnecessary to cut off communication between the teat cups and the pulsation pipe 21 in which air and vacuum alternately obtains. The pulsation nipples 26 may thus be a fixture on the claw as described.

Having now described my invention what I claim as new and desire to secure by Letters Patent is:—

1. An improved claw for milking machines, including a milk pipe having two opposite pairs of cylindrical plug casings, a tapered rotary plug in each of said casings, a milk nipple attached to each of said plugs and adapted when in raised or milking position to communicate with the interior of the milk pipe, and means between opposite pairs of plugs for exerting an endwise pressure thereon.

2. An improved claw for milking machines comprising in combination a milk pipe having two opposite pairs of cylindrical plug casings, a longitudinally tapered rotary plug in each of said casings, a milk nipple attached to each of said plugs and adapted when in raised or milking position to communicate with the interior of the milk pipe and springs interposed between the longitudinally opposite plugs, said springs being adapted to exert an endwise pressure on the plugs for the purpose set forth.

3. An improved claw for milking machines comprising in combination a milk pipe having two opposite pairs of cylindrical plug casings, a longitudinally tapered rotary plug in each of said casings, a milk nipple attached to each of said plugs and adapted when in raised or milking position to communicate with the interior of the milk pipe, springs adapted to exert an endwise pressure on said plugs, a pulsation pipe attached to the milk pipe, and fixed pulsation nipples permanently communicating with said pulsation pipe.

4. An improved claw for milking machines comprising in combination a milk pipe, a pulsation pipe attached to the milk pipe, a pair of cylindrical plug casings disposed near each end of the milk pipe, each of said casings having a circumferential opening in its wall, an open mouth extending through the plug wall from said opening to one end of the casing, a rotary plug accommodated by each said casing, a milk nipple projecting from each plug through said circumferential opening and adapted when in raised or milking position to communicate with the interior of the milk pipe and fixed pulsation nipples permanently communicating with said pulsation pipes for the purpose set forth.

5. An improved claw for milking machines comprising in combination a milk pipe having associated therewith two opposite pairs of cylindrical plug casings, a longitudinally tapered rotary plug in each of said casings, a milk nipple attached to each of said plugs and adapted when in raised or milking position to communicate with the interior of the milk pipe, and springs interposed between the longitudinally opposite plugs, each said spring including a longitudinal intermediate portion and a sidewardly projecting arm at each end of said intermediate portion, said arms being adapted to press outwardly in opposite directions against the ends of the plugs substantially as and for the purpose set forth.

6. An improved claw for milking machines comprising in combination a milk pipe having two opposite pairs of cylindrical plug casings, a longitudinally tapered rotary plug in each of said casings, a milk nipple attached to each of said plugs and adapted when in raised or milking position to communicate with the interior of the milk pipe, springs interposed between the longitudinally opposite plugs, said springs being adapted to exert an endwise pressure on the plugs and a milk port connecting the interior of each plug casing with the milk pipe said port being elongated lengthwise of the casing substantially as and for the purpose set forth.

7. In a claw for milking machines a spring comprising a longitudinal intermediate portion, sidewardly projecting arms at each end of said intermediate portion and longitudinally disposed end portions projecting substantially at right angles from said arms substantially as and for the purpose described.

In testimony whereof I affix my signature.

J. H. DAVIES.

Witness:
  DISTORF KELSON.